Patented Sept. 18, 1945

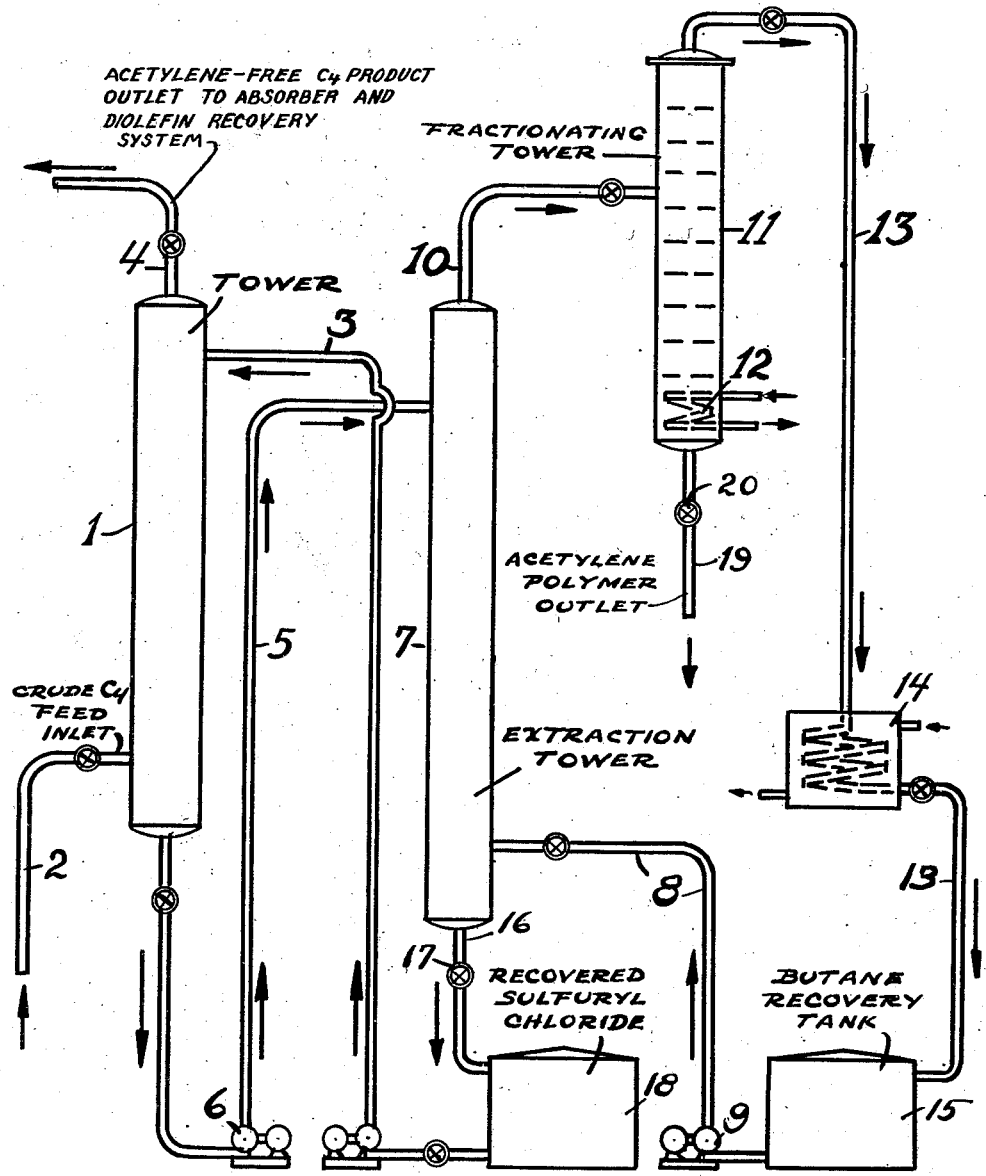

2,384,902

UNITED STATES PATENT OFFICE 2,384,902

SEPARATION OF ACETYLENES FROM HYDROCARBON MIXTURES

Egi V. Fasce, Baton Rouge, La., assignor to Standard Oil Development Company, a corporation of Delaware Application April 9, 1943, Serial No. 482,366

3 Claims. (Cl. 260—681.5)

This invention relates to improvements in the process for separating diolefins from hydrocarbon mixtures containing diolefins and acetylenes and relates particularly to the separation of alkyl acetylenes before the diolefins are separated and segregated from the said hydrocarbon mixture.

The chief sources of diolefins are hydrocarbon mixtures obtained by cracking petroleum oils. The cracked mixtures are first distilled to obtain fractions containing only olefin and paraffin hydrocarbons having the same number of carbon atoms to the molecule, for examples 4, 5, and 6. All such fractions, for example one having 4 carbon atoms to the molecule, contain both the desirable diolefin and small traces of alkyl acetylenes in concentrations that may range up to several thousand parts per million. For example, 4 carbon atom mixtures of hydrocarbons obtained by pyrolyzing petroleum oils, by analysis, were found to contain from 500 to 800 parts of alkyl acetylenes per million of oil.

Alkyl acetylenes react with the copper solution used for the extraction of diolefins and form compounds which may explode if the material is allowed to dry. Not only is it desirable to remove the alkyl acetylenes to avoid this hazard but the presence of the alkyl acetylenes even in small amounts in the diolefins when used as a feed for the rubber unit yields a product of inferior quality. Rubber prepared from diolefins containing alkyl acetylenes has a very low tensile strength and therefore it is essential that the alkyl acetylenes are first removed before the diolefins are separated from the hydrocarbon mixture and used in the manufacture of rubber.

An object of this invention is to provide means for the separation and removal of alkyl acetylenes from hydrocarbon mixtures before the diolefins are removed and without any substantial reduction in the diolefin content of the said hydrocarbon mixture.

According to this invention a countercurrent liquid phase extraction in a packed tower is used to remove acetylenes from cracked hydrocarbon fractions, for example a fraction having 4 carbon atoms to the molecule. The hydrocarbon mixture having an acetylene content as high as 0.1 to 1% is contacted with a sulfuryl chloride solution containing 0.1 to 1% of an organic peroxide such as benzoyl peroxide. On contacting the hydrocarbon mixture with the sulfuryl chloride, selective polymerization of the acetylenes occurs and these undesirable constituents are separated before the hydrocarbon mixture is treated with a selective absorbent for the diolefins, for example ammoniacal cuprous acetate solution, sulfur dioxide absorbents, slurries of cuprous chloride with ammonium chloride, monoethanolamine, cuprous chloride, etc. The temperatures used in contacting the sulfuryl chloride containing organic peroxide with the hydrocarbon mixture, may be varied from 0° to 75° F. at pressures up to 100 lbs. per square inch. The ratio of hydrocarbon to solvent may be varied from about 1:8 to about 2:1. The hydrocarbon mixture, after the acetylenes have been removed, is washed with water to remove the last traces of sulfuryl chloride.

The following description when read with reference to the accompanying drawing will illustrate one embodiment of this invention. A mixture of olefin and paraffin hydrocarbons is distilled into fractions having the same number of carbon atoms to the molecule, that is, 4, 5, and 6. The separation of alkyl acetylenes from the fraction having 4 carbon atoms to the molecule will be used here as an example for illustration only as the other fractions may be treated in a similar manner.

Referring to the drawing, number 1 designates a packed tower. Other types of towers may be used such as one with bubble caps, baffles, etc. Into the lower part of tower 1 is passed by means of pipe 2 the C₄ fraction containing butadiene and which may have an alkyl acetylene content as high as 0.1 to 1%. In the upper part of tower 1 by means of pipe 3 is passed a sulfuryl chloride solution containing from 0.1 to 1% of an organic peroxide such as benzoyl peroxide. The two solutions are passed in countercurrent flow and an alkyl acetylene free C₄ hydrocarbon fraction is recovered through pipe 4.

The sulfuryl chloride solution containing the benzoyl peroxide on contacting with the C₄ hydrocarbon mixture effects the selective polymerization of the alkyl acetylenes. The alkyl acetylene polymers dissolved in the sulfuryl chloride solution are removed from tower 1 by means of pipe 5, which is provided with pump 6. The solution of the alkyl acetylene polymers is passed to the upper part of extraction tower 7. In the lower part of tower 7 through pipe 8 provided with pump 9 is passed a light paraffin hydrocarbon such as butane which butane flows in countercurrent relation to sulfuryl chloride dissolving out the alkyl acetylenes. The butane with alkyl acetylenes in solution is removed from tower 7 by means of pipe 10 and passed to fractionating tower 11. Tower 11 may be packed or provided with bubble caps, trays or otherwise arranged. Heat is supplied to the bottom of tower 11 by means of coil 12 and the butane is distilled. The butane vapors are passed from tower 11 through outlet pipe 13 and condenser 14 to butane recovery tank 15. The butane may be recycled through pipe 8 to tower 7.

Sulfuryl chloride is withdrawn by pipe 16 provided with valve 17 from extraction tower 7 and passed to storage tank 18 and may be recycled through pipe 3 to tower 1. Alkyl acetylenes are removed to storage not shown from fractionating tower 11 by means of pipe 19 provided with valve 20.

I claim:

1. In a process for separating a diolefin from a mixture of hydrocarbons containing a diolefin and an alkyl acetylene, the improvement which comprises contacting a mixture of hydrocarbons containing a diolefin and an alkyl acetylene with a sulfuryl chloride solution containing from 0.1-1% of benzoyl peroxide, separating the sulfuryl chloride solution containing from 0.1-1% of benzoyl peroxide and absorbed alkyl acetylene from the unabsorbed hydrocarbon, and contacting the residual unabsorbed hydrocarbons with a selected absorbent for the diolefins.

2. In a process for separating a diolefin from a mixture of hydrocarbons containing a diolefin and an alkyl acetylene, the improvement which comprises contacting a mixture of hydrocarbons containing a diolefin and an alkyl acetylene with a sulfuryl chloride solution containing from 0.1-1% of benzoyl peroxide, separating the sulfuryl chloride solution containing from 0.1-1% of benzoyl peroxide and absorbed alkyl acetylene from the unabsorbed hydrocarbon and contacting the residual unabsorbed hydrocarbons with an ammoniacal cuprous acetate solution, separating the ammoniacal cuprous acetate solution from the unabsorbed hydrocarbons and heating the said separated ammoniacal cuprous acetate solution to recover diolefins.

3. In the separation of butadiene from a mixture of hydrocarbons obtained by cracking petroleum oils and containing butadiene and alkyl acetylene, the improvement which comprises contacting the mixture of hydrocarbons obtained by cracking petroleum oils and containing butadiene and alkyl acetylene with a sulfuryl chloride solution containing from 0.1-1% of benzoyl peroxide, separating the sulfuryl chloride solution containing the benzoyl peroxide and absorbed hydrocarbons from the unabsorbed hydrocarbons, contacting the separated sulfuryl chloride containing the benzoyl peroxide and the absorbed hydrocarbons with a liquid hydrocarbon which is volatile at room temperature, separating the liquid hydrocarbon from the sulfuryl chloride solution and heating the liquid hydrocarbon to separate polymers of alkyl acetylene.

EGI V. FASCE.